United States Patent
Wells

Patent Number: 6,015,244
Date of Patent: *Jan. 18, 2000

[54] WIND DIRECTING SEA WALL

[75] Inventor: Raymond Wells, Mayo, Fla.

[73] Assignee: Storm Diverter Corporation, Oakbrook Terrace, Ill.

[*] Notice: This patent is subject to a terminal disclaimer.

[21] Appl. No.: 09/162,042

[22] Filed: Sep. 28, 1998

Related U.S. Application Data

[63] Continuation of application No. 08/941,481, Oct. 1, 1997, abandoned.

[51] Int. Cl.[7] .............................. E02B 3/04; E02B 3/06; E01F 7/02
[52] U.S. Cl. ....................... 405/22; 244/114 B; 256/12.5; 405/21; 405/31
[58] Field of Search ...................... 405/15–35; 256/12.5; 244/114 B, 199, 203, 53 B; 114/103; 416/90 A

[56] References Cited

U.S. PATENT DOCUMENTS

| | | |
|---|---|---|
| 905,596 | 12/1908 | Smith . |
| 1,811,005 | 6/1931 | Forbes . |
| 2,826,382 | 3/1958 | Hayden ............................. 256/12.5 X |
| 2,886,951 | 5/1959 | Valembois ................................. 405/31 |
| 3,080,937 | 3/1963 | Garbell . |
| 3,191,728 | 6/1965 | David .................................. 244/114 B |
| 3,473,786 | 10/1969 | Luebke ..................................... 256/12.5 |
| 3,490,239 | 1/1970 | Vincent . |
| 3,538,710 | 11/1970 | Tourmen . |
| 4,000,618 | 1/1977 | Stovall ....................................... 405/21 |
| 4,367,978 | 1/1983 | Schaaf et al. . |
| 4,666,334 | 5/1987 | Karaus . |
| 4,784,521 | 11/1988 | Martin et al. . |
| 4,818,141 | 4/1989 | Rauch . |
| 4,842,442 | 6/1989 | Caulfield . |
| 5,238,326 | 8/1993 | Creter . |

FOREIGN PATENT DOCUMENTS 907146  2/1982  Russian Federation .

*Primary Examiner*—Dennis L. Taylor
*Attorney, Agent, or Firm*—Lee, Mann, Smith, McWilliams, Sweeney & Ohlson

[57] ABSTRACT

A sea wall able to diffuse sheets of wind borne water being blown over the sea wall by a strong wind. The sea wall has a vertically extending barrier, preferably topped by a cap, and wind diverting member mounted above the uppermost surface of the barrier, or cap, if the cap is provided and is disposed above the barrier. The wind diverting member has curved internal air passages gathering air from the water side of the sea wall and discharging air upwardly. The air passages optionally accelerate gathered air by causing the air outlets to be of smaller cross sectional area than that of the air inlets. The sea wall includes drains for disposing of water gathering on the sea wall and the wind diverting member.

3 Claims, 3 Drawing Sheets

WIND DIRECTING SEA WALL

RELATED APPLICATIONS

This application is a continuation U.S. application Ser. No. 08/941,481, filed Oct. 1, 1997 now abandoned.

BACKGROUND OF THE INVENTION

1. Field of the Invention

The present invention relates to sea walls protecting dry land structures from damage from bodies of water. In particular, the invention improves effectiveness of a sea wall by harnessing wind blowing water towards the dry land to diffuse effect of wind blown water.

2. Description of the Prior Art

Natural bodies of water such as the ocean, seas, lakes, and the like occasionally cause damage to normally dry ground during storms. Sea walls have been provided to mitigate or prevent such damage, but have not always proved fully effective. One type of damage which may occur results from water lifted from the natural body of water and propelled over the sea wall by strong winds. Damage may result not only from mass of water, as might arise from crashing waves and rising water levels, but also from velocity of driven water. Wind speeds increase towards the water surface, and are capable of lifting water in sheets from the natural body of water. These sheets of water are greatly accelerated and propelled towards the shore, and may impinge on the susceptible ground structure with great force, thereby causing damage by erosion.

When this water strikes ground surfaces, significant erosion may ensue. Examples of ground surfaces and structures which are susceptible to such attack include natural formations such as bluffs and dunes, but also artificial structures such as shoulders of roads, berms, drainage ditches, and the like. Such structures are typically formed from loose fill dirt, sand, light gravel, and other materials lacking resistance to erosion present in materials such as concrete, asphalt, and others.

Sea walls may be designed to redirect the force of moving water. Examples are seen in U.S. Pat. No. 3,490,239, issued to Georges Vincent on Jan. 20, 1970, U.S. Pat. No. 4,666,334, issued to Edward Karaus on May 19, 1987, and U.S. Pat. No. 4,784,521, issued to David T. Martin et al. on Nov. 15, 1988. Vincent and Martin et al. have openings for admitting some of the flow of impinging water to pass while the remainder is redirected. This feature has the effect of diffusing force of the water. Karaus merely provides inclined reflective surfaces. These inventions also display conduits internal to the respective sea wall, for draining water or for directing water to storage as ballast. None of these inventions exploit the very wind exacerbating the problem, as does the present invention.

U.S. Pat. No. 4,842,442, issued to Hubert E. Caulfield on Jun. 27, 1989, suggests extending a sea wall upwardly. Caulfield does not attempt to exploit natural forces, as is accomplished by the present invention. His invention merely cooperates with conventional caps of sea walls to render the barrier higher.

None of the above inventions and patents, taken either singly or in combination, is seen to describe the instant invention as claimed.

SUMMARY OF THE INVENTION

The present invention improves on conventional sea walls which merely provide physical barriers acting in direct interference with impinging water by exploiting potentially destructive force of the wind by redirecting it and forming an air curtain above the improved sea wall. This effect is provided by forming passages inside the sea wall. Each passage has an air scoop opening towards the body of water, and an upwardly directed vent. Wind blowing towards the shore enters the sea wall at the air scoop, is redirected by a bend of the passage within the sea wall, and is discharged from the sea wall as an upwardly directed jet.

This jet is highly effective at breaking up sheets of water lifted from the body of water. It must be borne in mind that wind propelling sheets of water towards the land travels faster than the propelled water. Sheets of water passing over high speed jets of air are broken up by the jets. Destructive potential of the water is greatly lessened as the sheets are transformed into droplets. The droplets fall against unprotected ground structures with greatly diffused force, compared to undisturbed sheets of water.

A zone of protection afforded by the sea wall can therefore extend well above the uppermost surface of the seawall. This zone of protection is provided solely by the destructive forces mitigated thereby. No powered or moving parts are required for the improved sea wall to enjoy effectiveness.

Velocity of the discharged jet of air can be increased by gradually decreasing diameter of the passage from the air scoop to the vent. A mild ram effect will then accelerate the air, so that it discharges at even greater velocity than the wind.

A sea wall incorporating the above described features may comprise a second or support wall disposed on the land side of the otherwise conventional sea wall, for supporting air guiding structure. A drainage system is provided between the sea wall and the support wall.

Accordingly, it is a principal object of the invention to provide apparatus for accelerating and redirecting wind upwardly at a sea wall, for intercepting and diffusing wind blown water.

It is another object of the invention to exploit natural wind to cause jets of air to be discharged upwardly near a sea wall.

It is a further object of the invention to diffuse destructive force of wind borne water lifted from a natural body of water near a shoreline.

Still another object of the invention is to extend effectiveness of a sea wall upwardly beyond the uppermost surface of the sea wall.

An additional object of the invention is to accelerate velocity of the upwardly directed air jets above that of the wind.

It is again an object of the invention to drain water from the improved sea wall.

Yet another object of the invention is to avoid requiring powered and moving parts in the improved sea wall.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
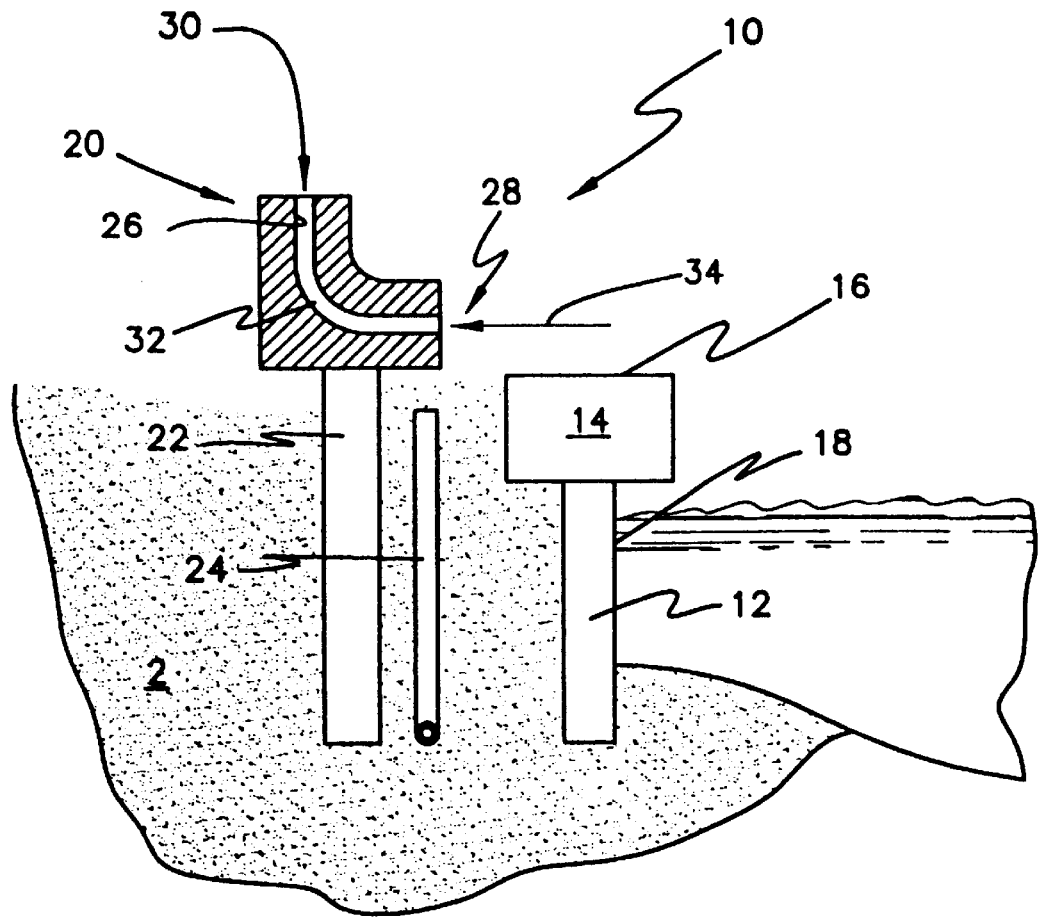
FIG. 1 is a side cross sectional view of the invention.

Turning now to FIG. 1 of the drawings, there is shown a sea wall 10 having a barrier 12 formed from a solid, erosion resistant material, such as concrete or a durable metal. Sea wall 10 is disposed on land 2 adjacent a body of water (not shown). Barrier 12 has a cap 14 having an upper surface 16, a forward surface 18, and may, where required include a footing, dead man anchor, or other structure (none shown), for anchoring barrier 12 within ground 2. Barrier is only representatively shown, and may be configured other than as the parallelepiped illustrated. For example, forward surface 18 may be curved, inclined, corrugated, or otherwise configured.

Sea wall 10 has the ability to utilize wind to diffuse bodies of wind borne water which are periodically lifted from the water and blown into ground 2 behind sea wall 10. For semantic purposes, the forward side of sea wall 10 will be understood to be that side facing the body of water, and the rear side will be that facing dry land. To diffuse bodies of water, a wind diverting member 20 is disposed above upper surface 16 of cap 14. If no cap is present, then the uppermost surface of the barrier will assume the role ascribed to surface 16 herein.

In the embodiment of FIG. 1, wind diverting member 20 is supported by a supporting wall 22 disposed to the rear of barrier 12. A water drainage conduit 24 is disposed in fluid communication between surface 16, or any other proximate surface disposed near the top of wind diverting member 20, and loose sand or fill dirt so as to discharge water which may be deposited on sea wall 10. The actual point of discharge of conduits 24 is unimportant, so long as water is ultimately conducted by gravity to the ground.

Wind diverting member 20 has at least one air passage 26 formed therein. Each air passage 26 has a forwardly facing air inlet 28 and an upwardly oriented air outlet 30 disposed in communication with air inlet 28. Air is gathered or directed into air passage 26 and is redirected and accelerated as it is discharged from outlet 30.

Actual configuration of air passage 26 is not critical, although construction promoting rapid, unimpeded air flow is helpful. To this end, air passage 26 has a bent or curved section 32 for promoting unimpeded air flow between inlet 28 and outlet 30. Also, the cross sectional inlet area should be at least as great in magnitude as the cross sectional outlet area for each air passage 26.

Figure 2:
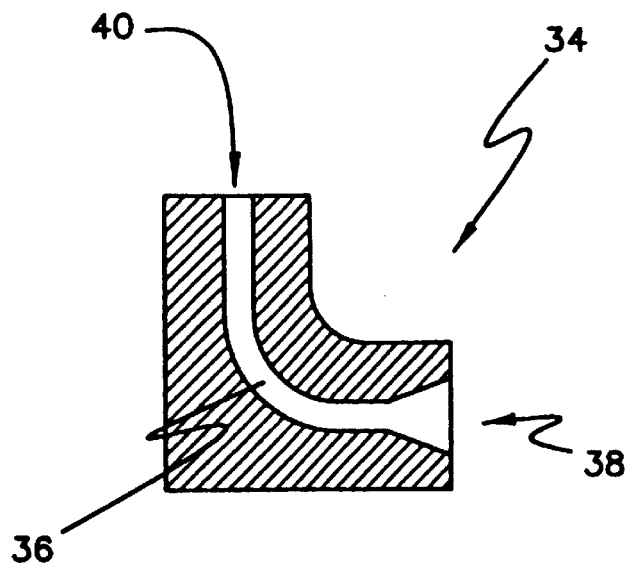
FIG. 2 is a side cross sectional view of an alternative embodiment of the novel component of the sea wall.

As shown in FIG. 2, an alternative embodiment 34 of the wind diverting member has an air passage 36 which is progressively reduced in diameter from inlet 38 to outlet 40 and thus in cross sectional area such that air inlet 38 has an inlet cross sectional area and its associated outlet 40 has an outlet cross sectional area of magnitude less than that of the inlet cross sectional area. This characteristic will provide a ram effect increasing velocity of air flow in air passage 36. The section of variable diameter may be located proximate inlet 38, outlet 40, the bend, or in several steps at any of these portions of passage 36.

Figure 3:
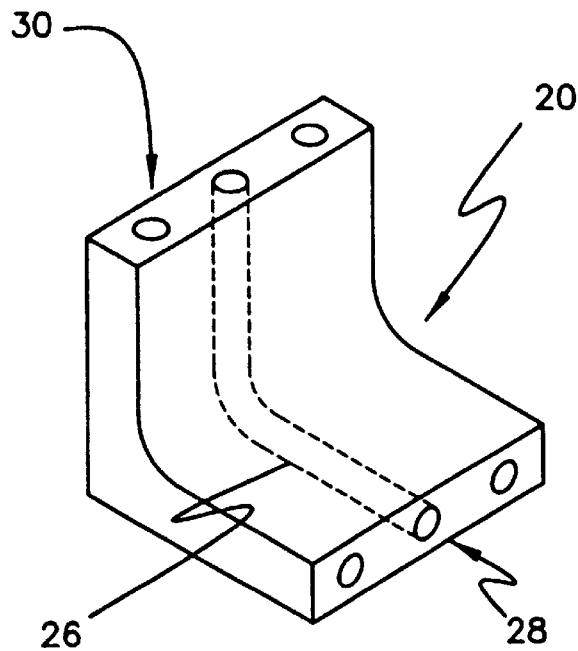
FIG. 3 is a perspective detail view of the novel component of the embodiment of FIG. 1.

Turning now to FIG. 3, wind diverting member 20 is seen to have a plurality of air outlets 30. In the embodiment of FIG. 3, each air passage 26 enables fluid communication within member 20 only between inlet 28 and outlet 30. This correlation of outlets to inlets is not critical, provided the requirement for at least equal cross sectional area of inlet 28 to its outlet 30 is satisfied.

Figure 4:
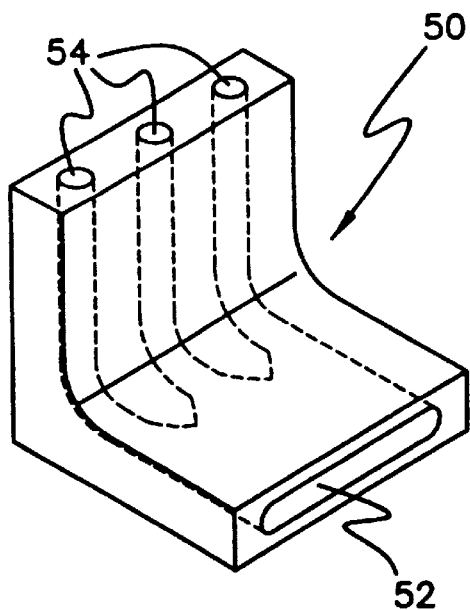
FIG. 4 is a perspective detail view of another alternative embodiment of the novel component of the sea wall.

As seen in a wind diverting member 50 shown in FIG. 4, a single large inlet 52 is provided. Inlet 52 branches into plural outlets 54. It will be seen by casual inspection that the cross sectional area of inlet 52 is greater than the combined cross sectional areas of individual outlets 54. Thus, a ram effect is provided by still another arrangement of air passages within wind diverting member 50. The arrangement of wind diverting member 50 may be said to provide a plurality of air outlets 54 all disposed in fluid communication with at least one air inlet 52. By contrast, wind diverting member 20 of FIG. 3 has a plurality of separate said air passages 26, each air passage 26 having one dedicated or exclusive air inlet 28 and one dedicated or exclusive air outlet 30. Each air passage 26 of wind diverting member 20 avoids fluid communication with another air passage and also with the exterior of member 20 other than through inlet 28 and outlet 30.

Figure 5:
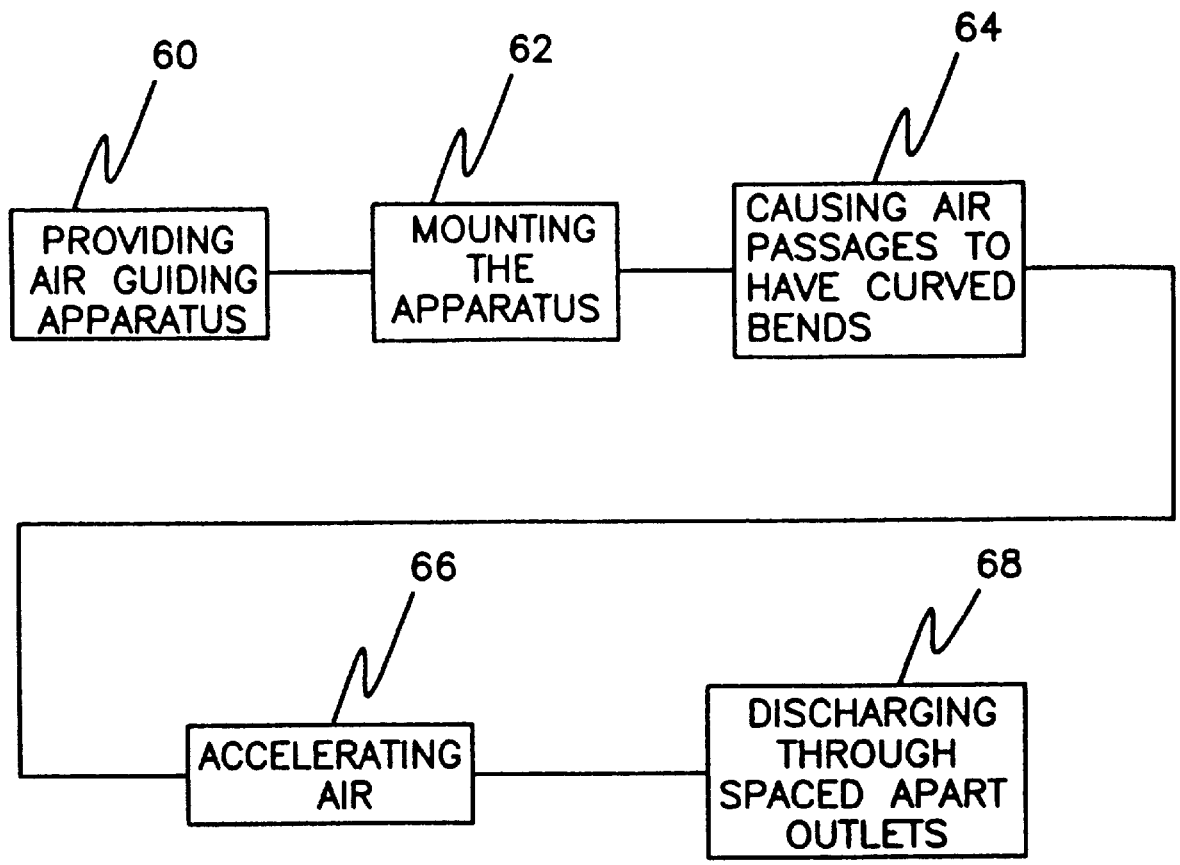
FIG. 5 is a block diagram of steps of a method practicing the invention, and is read from left to right.

The invention need not be practiced by reproducing the precise constructions set forth above. Rather, it will be practiced by providing any apparatus resulting in the following steps of a method of enhancing performance of a sea wall by intercepting and diffusing wind borne water with at least one air jet powered by wind. As summarized in FIG. 5, necessary steps of this method include at a minimum a step 60 of providing air guiding apparatus having at least one air passage including an air inlet and at least one air outlet disposed to be in fluid communication only with the air inlet, and a subsequent step 62 of mounting the air guiding apparatus relative to a sea wall such that all air inlet faces forwardly and all air outlets face upwardly.

Air guiding apparatus is any device performing the function of member 20, 34, or 50. This apparatus may be a solid having passages formed therein, or may be formed from pipes (not shown) or similar conduits. It is possible that the air passage not be fully enclosed in the manner of a pipe or tunnels depicted throughout FIGS. 1, 2, 3, and 4, having instead substantial but incomplete closure. The latter construction may be employed, but is considered to provide impaired air flow compared to fully closed passages.

The above method may be improved by practicing the following additional steps. A step 64 of causing every one of the air passages to have only curved bends, a step 66 of concentrating and accelerating air entering the air inlet prior to discharge from the air outlet, and a step 68 of discharging air collected in the air inlet through plural, spaced apart air outlets may be added to the basic method utilizing steps 60, 62. The various steps may be practiced in any desired and feasible combination.

It is contemplated that the novel construction may be employed in several ways apart from being constructed integrally with an otherwise conventional sea wall. For example, a pre-existing sea wall (not shown) may be improved by attachment of structure providing the novel benefits. Attachment may be either permanent or by releasable or removable fasteners. In a further embodiment, structure incorporating the novel features may be movably attached to a sea wall. The last concept is illustrated in an example, in low lying areas susceptible to inundation by storm surges, a floating structure may be chained to or above a seawall. If high water submerges the original sea wall, the present invention will still be able to mitigate in part erosion causing influences of driven water.

It is to be understood that the present invention is not limited to the embodiments described above, but encompasses any and all embodiments within the scope of the following claims.

I claim:

1. A wind directing water dissipating unit adapted to be positioned adjacent to and above a sea wall barrier on a body of water, said unit comprising:

a water facing wall and an upward facing wall;

a plurality of wind directing passages in said unit, each said passage including an inlet passing through said water facing wall and an outlet passing through said upward facing wall where each said wind directing passage has a diminishing cross section from said inlet to said outlet such that air entering each said inlet of a passage is redirected and accelerated as the air is discharged from said outlet of said passage;

said inlets on said water facing wall being located above the normal surface of the body of water to prevent blockage of said inlets by the water, so that during stormy-windy conditions, air entering and passing through said passages creates a generally vertical air curtain above said upward facing wall;

whereby any air-borne water lifted and driven over said unit is dissipated by said air curtain.

2. The wind directing water dissipating unit of claim 1, wherein said water facing wall of said unit is located above the sea wall.

3. The wind directing water dissipating unit of claim 1, wherein said plurality of wind directing passages are substantially equal in length to one another.

* * * * *